United States Patent
Otani et al.

(10) Patent No.: US 8,111,706 B2
(45) Date of Patent: Feb. 7, 2012

(54) PREMISES GATEWAY DEVICE

(75) Inventors: Atsushi Otani, Fujisawa (JP); Hisa Tsuzuki, Chigasaki (JP); Makoto Hasegawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 12/632,031

(22) Filed: Dec. 7, 2009

(65) Prior Publication Data

US 2010/0202467 A1 Aug. 12, 2010

(30) Foreign Application Priority Data

Feb. 12, 2009 (JP) .................... 2009-029465

(51) Int. Cl.
*H04L 9/00* (2006.01)

(52) U.S. Cl. .............. 370/401; 713/153; 713/600

(58) Field of Classification Search .................. None
See application file for complete search history.

(56) References Cited

U.S. PATENT DOCUMENTS

2002/0156899 A1 10/2002 Sekiguchi

FOREIGN PATENT DOCUMENTS

| JP | 2002-319956 A | 10/2002 |
| JP | 2004-280216 A | 10/2004 |

*Primary Examiner* — John Pezzlo
*Assistant Examiner* — Matthew Campbell
(74) *Attorney, Agent, or Firm* — Mattingly & Malur, PC

(57) ABSTRACT

In a premises gateway device that performs encryption or decryption under the IPsec, the throughput of a processor is varied depending on a type of data to be treated in order to realize reduction in power consumption. In the premises gateway device to which a telephone, PCs, and a home appliance that are pieces of home network equipment are connected and which transmits or receives data using an ISP and an IPsec tunnel via an ONU, an OLT, and a carrier network, relevant home network equipment and a data rate are decided based on the data to be treated. The frequency of a clock to be fed to the processor is varied depending on the information.

8 Claims, 11 Drawing Sheets

| DATA TYPE | DATA RATE | CLOCK FREQUENCY ($\alpha$ VALUE) | |
|---|---|---|---|
| TELEPHONE-RELATED DATA | 64kbit/s | 32kHz | |
| ETHERNET-CONNECTED PC-RELATED DATA | 10Mbit/s | 5MHz | ※1) |
| | 100Mbit/s | 50MHz | |
| | 1Gbit/s | 500MHz | |
| WIRELESSLY-CONNECTED PC-RELATED DATA | 11Mbit/s | 5.5MHz | ※2) |
| | 53Mbit/s | 26.5MHz | |
| | 300Mbit/s | 150MHz | |
| | ... | ... | |
| HOME APPLIANCE-RELATED DATA | 20kbit/s | 10kHz | |
| | 250kbit/s | 125kHz | |
| | ... | ... | |
| ... | ... | ... | |

※1) DEPENDENT ON LINK RATE
※2) DEPENDENT ON PROTOCOL OR COMMUNICATING SITUATION

FIG. 6

| EVENT | | CLOCK FREQUENCY |
| --- | --- | --- |
| IF | EVENT OF INITIATION OF COMMUNICATION | ($\alpha$ VALUE) |
| TELEPHONE-RELATED DATA | RECEPTION OF CALL TERMINATION SIGNAL | 32kHz |
| | DETECTION OF OFF-HOOK SIGNAL | 32kHz |
| ETHERNET-CONNECTED PC-RELATED DATA | RECEPTION OF ADDRESS REQUEST DATA RATE: 10Mbit/s | 5MHz |
| | RECEPTION OF ADDRESS REQUEST DATA RATE: 100Mbit/s | 50MHz |
| | RECEPTION OF ADDRESS REQUEST DATA RATE: 1Gbit/s | 500MHz |
| WIRELESSLY-CONNECTED PC-RELATED DATA (EXECUTION RATE IS DEFINED IN PHYSICAL LAYER) | RECEPTION OF ADDRESS REQUEST DATA RATE: 11Mbit/s | 5.5MHz |
| | RECEPTION OF ADDRESS REQUEST DATA RATE: 53Mbit/s | 26.5MHz |
| | RECEPTION OF ADDRESS REQUEST DATA RATE: 300Mbit/s | 150MHz |
| | ... | ... |
| HOME APPLIANCE-RELATED DATA | RECEPTION OF ACCESS REQUEST COMMUNICATING SITUATION: 20kbit/s | 10kHz |
| | RECEPTION OF ACCESS REQUEST COMMUNICATING SITUATION: 250kbit/s | 125kHz |
| | ... | ... |
| ⋮ | ⋮ | ⋮ |

FIG. 7

PREMISES GATEWAY DEVICE

CLAIM OF PRIORITY

The present application claims priority from Japanese patent application JP 2009-029465 filed on Feb. 12, 2009, the contents of which are hereby incorporated by reference into this application.

BACKGROUND OF THE INVENTION

1. Field of the Invention

The present invention relates to a premises gateway device, more particularly, to a premises gateway device that realizes connection between a home network and the Internet which is a public network.

2. Description of the Related Art

In recent years, along with improvement in an Internet access technology, home networks have evolved markedly. Access to web sites at a personal computer (PC) and transfer of mails are previously the main usages of the home network. The features of a network at home have diversified. Using the network, for example, an inexpensive telephony service based on the Voice-over-IP (VoIP) technology is received, a bidirectional data communication service is received over the Internet through a television broadcast, or a home appliance such as an air conditioner or a refrigerator or lightings including fluorescent lamps are controlled outdoors over the Internet. The role of a premises gateway device to be used to connect the pieces of equipment onto the Internet has become pivotal.

The premises gateway device interconnects such pieces of equipment as a PC, a telephone, a home appliance, and lightings which constitute the foregoing home network, and transmits or receives data to or from an Internet service provider (ISP) via an optical network unit (ONU) that is subscriber-side equipment, an optical line terminator (OLT) that is station-side equipment, and a carrier network which constitute a passive optical network (PON) system. The ISP connects the premises gateway device onto the Internet or a public switched telephone network (PSTN) via a VoIP gateway according to the type of data. For connection between each household and the ISP, the PPP-over-Ethernet (PPPoE) that is a protocol providing a pseudo point-to-point network has often been employed. In recent years, the IPsec that is a protocol providing a standard feature for the IP Version 6 (IPv6) has been used to form an IPsec tunnel between the premises gateway device and the ISP so that each of the pieces of equipment at home and the ISP can safely transfer data to or from each other. The premises gateway device encapsulates and encrypts data sent from premises network equipment and transfers the data to the ISP, or decrypts and decapsulates data sent from the ISP and transfers the data to the home network equipment. Data encrypting/decrypting processing has to be performed on all data items to be treated, and a processing time largely depends on a data rate. What is referred to as the data rate refers to an amount of data per a unit time.

The throughput of the premises gateway device is proportional to the operating frequency of a processor as long as the same type of processor is taken into account. Therefore, in the premises gateway device, the processor operates at a frequency at which the throughput permitting data to be treated at the highest data rate that should be guaranteed under the specifications for the premises gateway device can be realized. With the advent of the PON system, the baud rate on an access network linking each household and a carrier station exceeds 1 gigabits/sec and is getting higher. Accordingly, the throughput requested for the premises gateway device is getting higher day by day. The premises gateway device realized a telephoning function and a function of controlling a home appliance outdoors. For example, for the telephoning function, the power supply of the premises gateway device cannot be turned off in order to treat an incoming call that occurs at an unknown time instant. For controlling a home appliance outdoors, the power supply of the premises gateway device cannot be turned off in order to receive control data at a time at which a user is not at home. The premises gateway device has to operate all the time. The power consumption required for the premises gateway device to stand by poses a non-negligible problem.

As a technique for reducing the power consumption required for the premises gateway device to stand by, there is a technique disclosed in, for example, JP-A-2002-319956. According to the technique, the gateway device is separated into a system 1 having the minimum necessary features for connection onto the Internet, and a system 2 having the features needed to run applications. The power supplies of the systems 1 and 2 are turned on or off in order to realize reduction in power consumption in a standby state.

In contrast, as a technique for dynamically varying the operating frequency of a processor, there is a technique disclosed in, for example, JP-A-2004-280216. According to the technique, a clock frequency optimal for running of an application program is varied depending on a load imposed on the processor during the previous run, and the clock frequency is thus finely controlled.

SUMMARY OF THE INVENTION

The premises gateway device is not necessarily installed near equipment having a user interface, but may be installed at a corner of a room or hung on a wall near an entrance. In such a case, even if the premises gateway device is provided with a power switch, a user may not be able to handle the power switch frequently. As long as the gateway device disclosed in JP-A-2002-319956 is concerned, the processor has to be physically separated into portions in association with the systems. This is disadvantageous in terms of the cost of the device and the size thereof. Supposing the processor is realized with one hardware device, the processor will be incorporated in the system 1 having the minimum necessary features for connection onto the Internet. The reduction in power consumption cannot be effectively achieved.

Further, the primary processing to be performed in the premises gateway device is encrypting/decrypting processing conformable to the IPsec. The processing depends on a data rate at which data is transmitted or received. Even when the means described in JP-A-2004-280216 is used to control the clock frequency of pulses to be fed to the processor, since a load imposed on the processor does not have any correlation to the previous load, the clock frequency cannot be controlled optimally. Therefore, it is hard to effectively reduce the power consumption.

Accordingly, an object of the present invention is to realize reduction in power consumption while keeping the necessary features of a premises gateway device, which performs encryption or decryption under the IPsec, active without the necessity of user's manipulations. Another object of the present invention is to vary the processing capability of a processor according to the type of data to be treated.

In order to accomplish the above objects, a data rate at which a premises gateway device treats data is adopted as control information for a clock frequency of pulses to be fed to a processor included in the premises gateway device that performs encryption or decryption under the IPsec. It is very hard to calculate the data rate at which data is treated by normal network equipment. However, types of pieces of premises network equipment to be interconnected are limited, and the upper limits of data rates for data to be treated by the pieces of equipment are nearly fixed. Namely, for example, as far as a telephone is concerned, a baud rate is on the order of 64 kilobits per sec. In the case of a home appliance, as long as a protocol called ZigBee (refer to IEEE802.15.4) is adopted due to a connection standard, the baud rate ranges from 20 kilobits per sec to 250 kilobits per sec. Even for a PC, if the PC is connected over Ethernet (registered trademark), the baud rate may be 10 megabits per sec, 100 megabits per sec, or 1 gigabit per sec according to the link rate supported by Ethernet. If the PC is connected by wireless, the baud rate may be 54 megabits per sec or 300 megabits per sec according to the protocol adopted or the communicating situation. Since the premises gateway device is provided with a feature of interconnecting the pieces of equipment, the premises gateway device acquires information on the baud rates, and controls the clock frequency of pulses to be fed to the processor thereof on the basis of the upper limits of the data rates according to the type of data to be treated. Therefore, the reduction in the power consumption of the premises gateway device can be realized with the necessary features kept active without the necessity of user's manipulations.

Even when power feed to any component other than the processor is controlled according to the operating situation of the component, or the operating mode of the component is shifted to a power saving mode, the reduction in the power consumption can be achieved.

The premises gateway device includes: a means for encrypting data received from premises network equipment and transferring it to an ISP; a means for decrypting encrypted data received from the ISP and transferring it to the premises network equipment; a processor that performs the encrypting or decrypting processing; a means for controlling the frequency of a clock to be fed to the processor; a means for determining a control quantity for the clock frequency according to data received from the premises network equipment; and a means for determining a control quantity for the clock frequency according to the encrypted data received from the ISP.

The premises gateway device determines the control quantity for the clock frequency by, for example, detecting an on-hook or off-hook signal sent from a telephone connected to the premises gateway device. The premises gateway device determines the control quantity for the clock frequency by, for example, detecting an address request signal sent from the premises network equipment. The premises gateway device determines the control quantity for the clock frequency by, for example, detecting an access request signal sent from remote equipment on the Internet.

According to the solving means of this invention, there is provided a premises gateway device that is connected to plural pieces of premises network equipment and transmits or receives data between the premises network equipment and a network of outdoor, comprising:

a processing unit that encrypts data received from the premises network equipment and transfers the data to the network, decrypts encrypted data received from the network and transfers the data to the premises network equipment consistent with destination and, operates according to an input clock;

a frequency determination table in which predetermined control quantities for a clock frequency are stored for the plural pieces of premises network equipment;

a clock frequency control unit that references the frequency determination table to obtain a clock frequency; and a clock production unit that produces a clock having the clock frequency obtained by the clock frequency control unit, and outputs the clock to the processing unit, wherein:

when the clock frequency control unit detects a signal that signifies initiation of communication and is sent from the premises network equipment, or a signal that signifies initiation of communication and is sent to the premises network equipment, the clock frequency control unit references the frequency determination table to acquire a control quantity for the clock frequency associated with the premises network equipment and, increases the clock frequency by the control quantity for the clock frequency which is acquired; and when the clock frequency control unit detects termination of communication with the premises network equipment, the clock frequency control unit decreases the clock frequency by the control quantity for the clock frequency.

According to the present invention, it is possible to realize reduction in power consumption while keeping the necessary features of a premises gateway device, which performs encryption or decryption under the IPsec, active without the necessity of user's manipulations. According to the present invention, it is possible to vary the processing capability of a processor according to the type of data to be treated.

BRIEF DESCRIPTION OF THE DRAWINGS

FIG. 6 is a diagram showing an example of the relationship among data types to be treated by the premises gateway device in accordance with the embodiment and parameters for use in determining the frequency of a clock to be fed;

FIG. 7 is a diagram showing an example of a frequency determination table specifying the data types to be treated by the premises gateway device in accordance with the embodiment;

DESCRIPTION OF THE PREFERRED EMBODIMENTS

Figure 1:
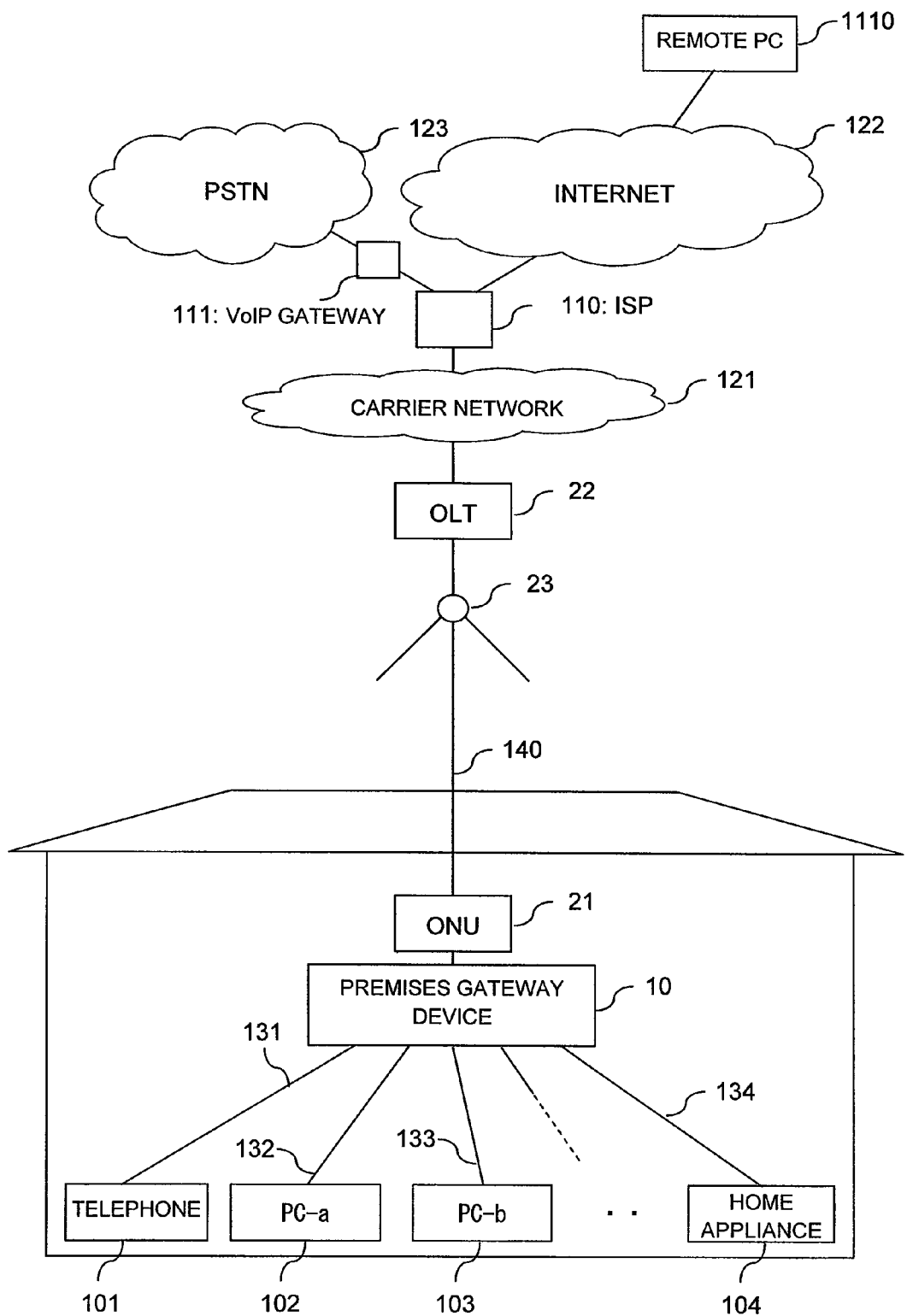
FIG. 1 is a diagram showing an example of a network topology to which a premises gateway device in accordance with an embodiment is adapted.

Referring to the drawings, an embodiment of the present invention will be described below.

FIG. 1 is a diagram showing an example of a network topology to which a premises gateway device in accordance with the present embodiment is adapted.

In FIG. 1, a premises gateway device 10 is installed in premises, and is connected to such pieces of home network equipment (premises network equipment) as a telephone 101, a PC-a 102, a PC-b 103, and a home appliance 104 in order to communicate with the pieces of equipment. The premises gateway device 10 transmits or receives data to or from communication equipment 110 at an ISP (hereinafter, an ISP 110) via an ONU 21, an OLT 22, and a carrier network 121 using an IPsec tunnel. The ONU 21, the OLT 22, and an optical splitter 23 constitute a PON system that provides an access network which links a carrier station and the premises gateway device 10 over an optical fiber 140. The carrier network 121 is a carrier network developed by a carrier which provides the access network. The carrier network 121 is, unlike the Internet 122, a closed network constructed with facilities provided by the carrier. A general user makes a connection onto the Internet via the ISP 110. The general user makes a connection onto the Internet 122 at a remote PC 1110, and accesses premises network equipment, for example, the home appliance 104. A VoIP gateway 111 is a device that terminates a telephony service provided under the IP, and makes a connection onto a PSTN 123 so as to implement the telephony service. A connection 131 between the premises gateway device 10 and telephone 101 is, for example, an analog connection. A connection 132 between the PC-a 102 and premises gateway device 10 is, for example, a wired connection over, for example, Ethernet. A connection 133 between the PC-b 103 and premises gateway device 10 is, for example, a wireless connection. A connection 134 between the home appliance 104 and premises gateway device 10 is, for example, a ZigBee connection. The connection modes are not limited to these ones but may be any other appropriate ones. The pieces of equipment to be connected to the premises gateway device 10 may be any other appropriate ones. For example, the telephone 101 may be equipment such as a PC having a telephoning feature, and the home appliance 104 may be lightings to be controlled outdoors, security equipment such as an anticrime equipment, or any other appropriate electric product. What is referred to as premises is not limited to the premises of a household but may be the premises of an office, a store, or a firm.

Figure 2:
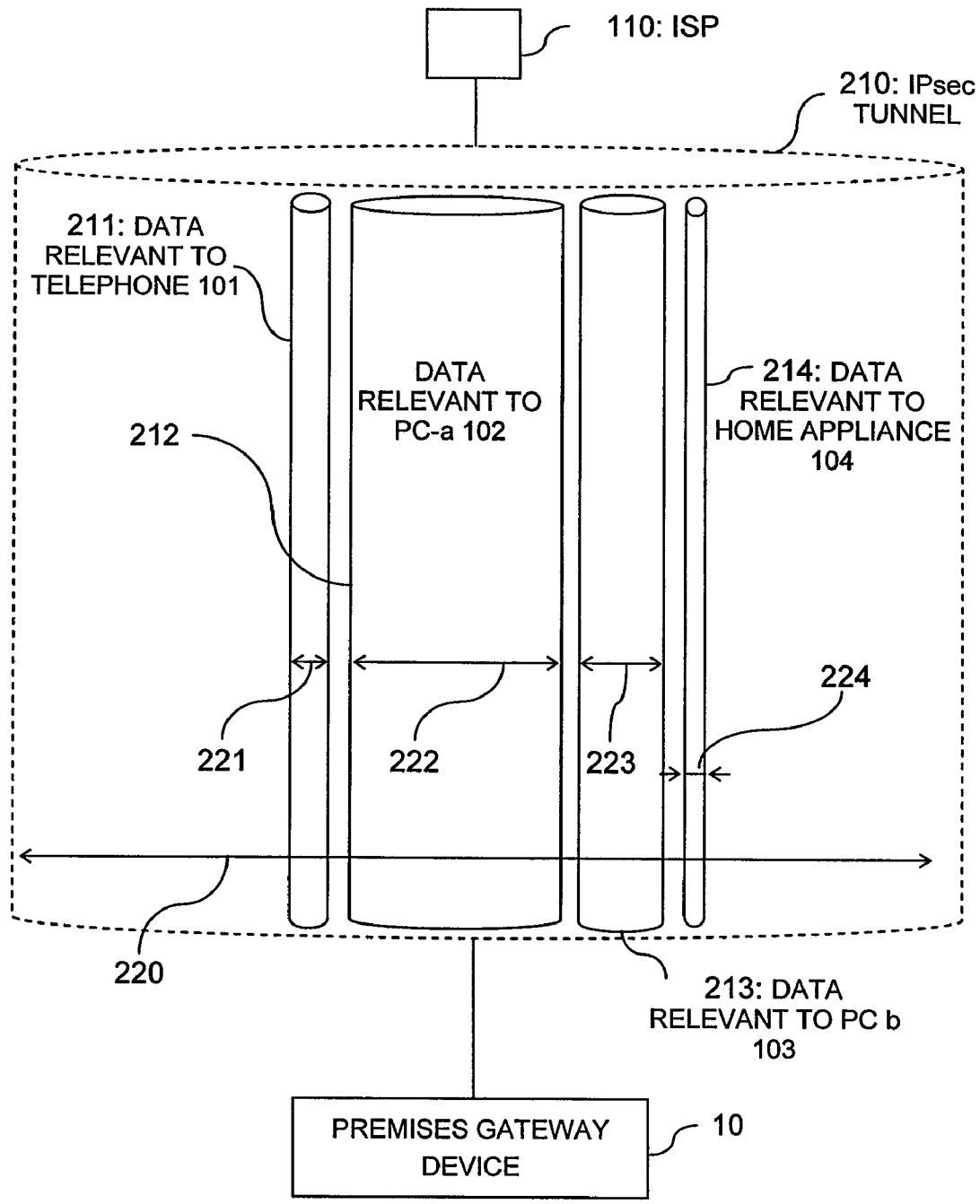
FIG. 2 is a diagram showing imaginary logical connection between the premises gateway device in accordance with the embodiment and an ISP.

FIG. 2 is an imaginary diagram showing the logical connection between the premises gateway device 10 and ISP 110.

An IPsec tunnel 210 is constructed between the premises gateway device 10 and ISP 110. Data 211 relevant to the telephone 101, data 212 relevant to the PC-a 102, data 213 relevant to the PC-b 103, and data 214 relevant to the home appliance 104 are transmitted or received through the IPsec tunnel 210. In the imaginary diagram, the thicknesses (220 to 224) of pipes express data rates (baud rates). For example, the thickness 221 is equivalent to 64 kilobits per sec that is the baud rate for telephones. The thickness 222 is equivalent to 100 megabits per sec that is the baud rate for PCs connected over Ethernet. The thickness 223 is equivalent to 54 megabits per sec that is the baud rate for wireless connection. The thickness 224 is equivalent to 20 kilobits per sec that is the baud rate stipulated by the ZigBee. The throughput a processor, which performs encryption or decryption in the premises gateway device 10, is requested to offer (for example, a clock frequency) depends on the baud rates.

The thickness 220 expresses a maximum value of a data rate supported by the premises gateway device 10, and is determined with the frequency of a clock to be fed to the processor. If the sum of the thicknesses 221 to 224 is smaller than that of the tunnel 210, it means that the throughput of the premises gateway device 100 has room and that the reduction in power consumption can be achieved by decreasing the clock frequency. In contrast, if the sum of the thicknesses 221 to 224 is larger than that of the tunnel 210, it means that the premises gateway device 10 will fail to perform data encrypting/decrypting processing and to sustain communication.

Figure 3:
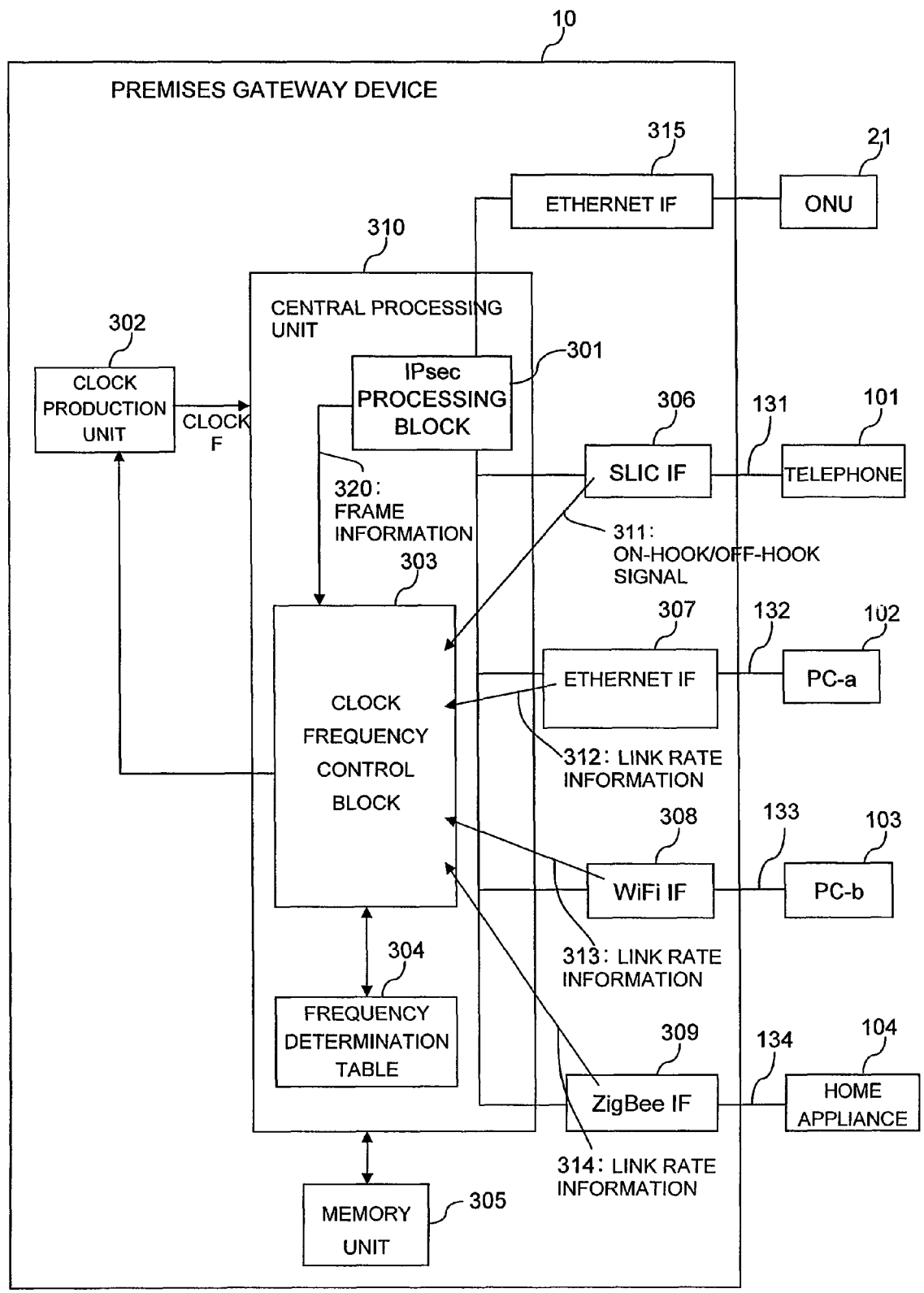
FIG. 3 is a configuration diagram of the premises gateway device in accordance with the embodiment.

FIG. 3 is a configuration diagram of the premises gateway device 10 in accordance with the present embodiment.

The premises gateway device 10 includes a central processing unit (processor) 310, an Ethernet interface 315 that is an interface (IF) connected to the ONU 21, a subscriber line interface circuit (SLIC) interface 306 that is an interface connected to the telephone 101, an Ethernet interface 307 that is an interface connected by wire to the PC-a 102, a wireless fidelity (WiFi) interface 308 that is an interface connected by wireless to the PC-b 103, a ZigBee interface 309 that is an interface connected to the home appliance 104, a memory unit 305, and a clock production unit 302.

The central processing unit 310 performs encrypting/decrypting processing conformable to the IPsec on data or implements clock frequency control according to the present embodiment. The central processing unit 310 includes, for example, an IPsec processing block 301, a clock frequency control unit 303, and a frequency determination table 304. The frequency determination table 304 may be stored in the memory unit 305. The IPsec processing block 301 performs encryption on data items sent from the pieces of equipment connected to the interfaces 306 to 309, 315, and performs decryption on data items to be sent to the pieces of equipment. The clock frequency control unit 303 searches the frequency determination table 304 on the basis of pieces of information (311 to 314) sent from the interfaces 306 to 309 and frame information 320 sent from the IPsec processing block 301, determines a clock frequency, and issues an instruction to the clock production unit 302. The clock production unit 302 outputs a clock having the instructed frequency to the central processing unit 310 in response to the instruction issued from the clock frequency control unit 303. Software and various kinds of pieces of designation information, which are necessary for the central processing unit 310 to act, are stored in the memory unit 305.

In the frequency determination table 304, magnitudes of control (α values) of the clock frequency which are determined in advance are recorded in association with the pieces of equipment connected to the premises gateway device 10. The control quantity (α value) for the clock frequency is a magnitude of control needed to increase or decrease the frequency of the clock to be fed to the processor. Since the pieces of equipment are connected via the interfaces, the magnitudes of control of the clock frequency may be recorded in association with the interfaces.

Figure 4:
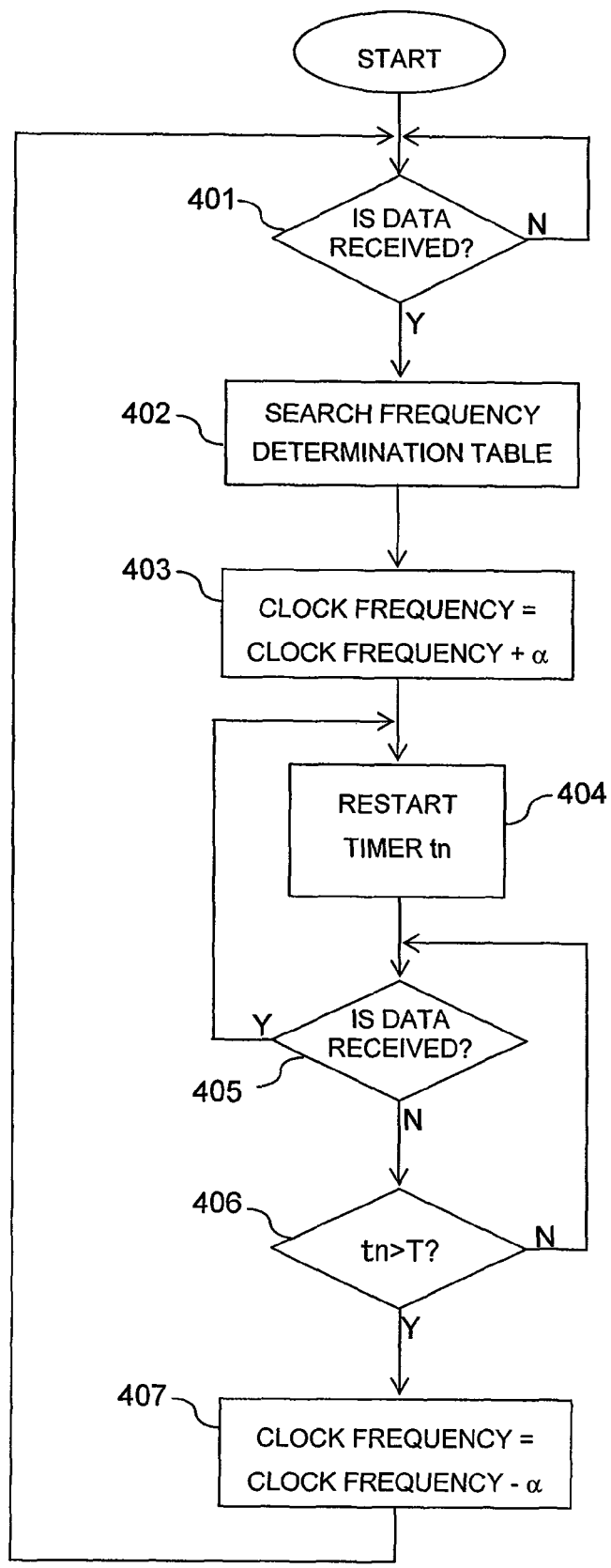
FIG. 4 is a diagram showing an example of a processing flow for determining the frequency of a clock to be fed to a processor included in the premises gateway device in accordance with the embodiment.

FIG. 4 shows an example of a processing flow for determining the frequency of a clock to be fed to the processor included in the premises gateway device 10 in accordance with the present embodiment.

The processing flow is defined for each of data items relevant to the pieces of home network equipment. Namely, a flow for monitoring telephone-related data and determining a clock frequency on the basis of the data is defined independently of a flow for monitoring home appliance-related data and determining the clock frequency on the basis of the data. In FIG. 4, the premises gateway device 10 first monitors reception of data in an initial state (401). Herein, what is referred to as data is appropriate data making it possible to recognize initiation of communication. For example, if the processing involves the telephone-related data, the data is an off-hook signal sent from the telephone set or an incoming call sent over a network. For example, if the processing involves PC-related data, the data is an address request signal (for example, an address resolution protocol (ARP) signal) sent from the PC. If the processing involves home appliance-related data, the data is an access request signal sent from the ISP. If reception of data is recognized, the throughput of the processor has to be improved in order to perform succeeding data transmission/reception. The clock frequency control unit 303 included in the premises gateway device 10 searches the frequency determination table 304 (402), and increases the clock frequency by the control quantity α for the clock frequency associated with the equipment (403). The α value is, as described later, determined with a baud rate dependent on data relevant to any of the pieces of home network equipment.

With the throughput of the processor improved, a timer tn (where n denotes 1, 2, 3, etc.) associated with the data is restarted (404) in order to keep monitoring whether the data is continuously received (405). The timer to is provided for each of the data items relevant to the pieces of home network equipment. When a data non-received state exceeds a certain time T (406), a decision is made that the processing for the data has become unnecessary, and the clock frequency is decreased by the α value in order to lower the throughput of the processor (407). Owing to the processing flow, the throughput of the processor necessary for each baud rate dependent on data relevant to each of the pieces of home network equipment can be dynamically designated.

Figure 5A:
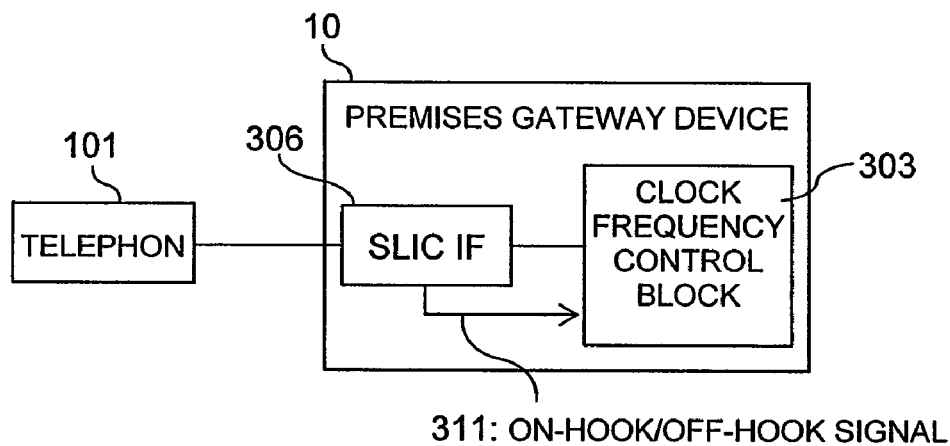
FIGS. 5A to 5C are diagrams showing methods of identifying data to be treated by the premises gateway device in accordance with the embodiment.
Figure 5B:
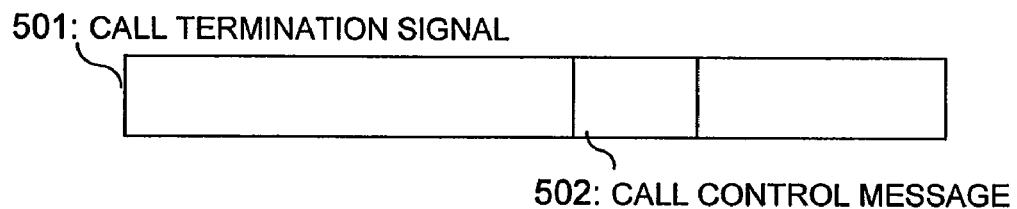
Figure 5C:
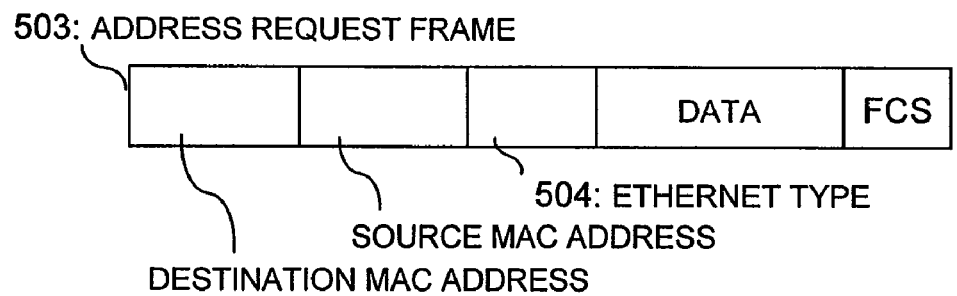

FIGS. 5A to 5C show data identification methods.

An off-hook signal that is used as telephone-related data at the time of call origination is detected as a change in a voltage, which occurs when a telephone line is connected responsively to an action such as lifting of a handset of a telephone, by the SLIC interface 306 included in the premises gateway device 10. An on-hook/off-hook signal 311 is transmitted in the form of a high/low-level signal to the clock frequency control unit 303, whereby the data can be detected (FIG. 5A). A call termination signal sent over a network can be detected when it is specified in a call control message 502 contained in a call termination signal frame 501 sent from the VoIP gateway 111 (FIG. 5B).

An address request signal sent as PC-related data from the PC-a 102 is detected when it is signified by a value of an Ethernet type 504 contained in an address request frame 503 received (FIG. 5C). A method of detecting the beginning of data on the basis of the address request signal is applied in the same manner irrespective of whether the address signal is an address request signal sent from the PC-a 102 connected by wire, an address request signal sent from the PC-b 103 connected by wireless under the IEEE802.11x standard, or an access request signal to be sent to the home appliance 104 connected under the ZigBee stipulated in the IEEE802.15.4 standard. To which of terminals the address request signal is related as data can be recognized based on the interface via which the data is received. If data is received via the SLIC interface 306, the data is recognized as the data relevant to the telephone. If data is received via the Ethernet interface 307, the data is recognized as the data relevant to the PC connected by wire. If data is received via the WiFi interface 308, the data is recognized as the data relevant to the PC connected by wireless. If data is received via the Ethernet interface 315 that is an upper-level interface, the data is recognized as the data relevant to the home appliance. Alternatively, the data may be recognized based on the transmission source or destination thereof.

FIG. 6 shows an example of the relationships among data types to be treated by the premises gateway device 10, data rates, and control quantities α for the clock frequency.

For telephone-related data, the data rate is 64 kilobits per sec. In order to treat the data, the clock frequency should be increased by the α value that is 32 kHz. For example, for Ethernet-connected PC-related data, if the PC communicates data at 10 megabits per sec, the clock frequency should be increased by 5 MHz. At what data rate the PC or home appliance communicates data is determined with a link rate and under a protocol. Incidentally, the data rate may be determined based on a communicating situation.

The α values vary depending on the type of processor. The numerical values listed in the drawing are provided as mere examples. Once the type of processor is determined, the throughput required under the IPsec can be calculated and the relationship to a data rate can be readily deduced. The α values are described as the clock frequency values. This means that the clock frequency is controlled to be incremented with a clock frequency value, which is associated with the throughput of the processor needed to perform simple processing other than processing stipulated in the IPsec, as a base value.

FIG. 7 shows an example of the relationship between events associated with data types, which the premises gateway device 10 treats as listed in FIG. 6, and the α values listed in FIG. 6. As for the events associated with the data types, the events associated with telephone-related data include reception of a call termination signal and detection of an off-hook signal, the events associated with Ethernet-connected PC-related data and wirelessly-connected PC-related data include reception of the address request, and the events associated with home appliance-related data include reception of the access request. At occurrence of each of the events, the necessary clock frequency (α value) is determined.

Figure 8:
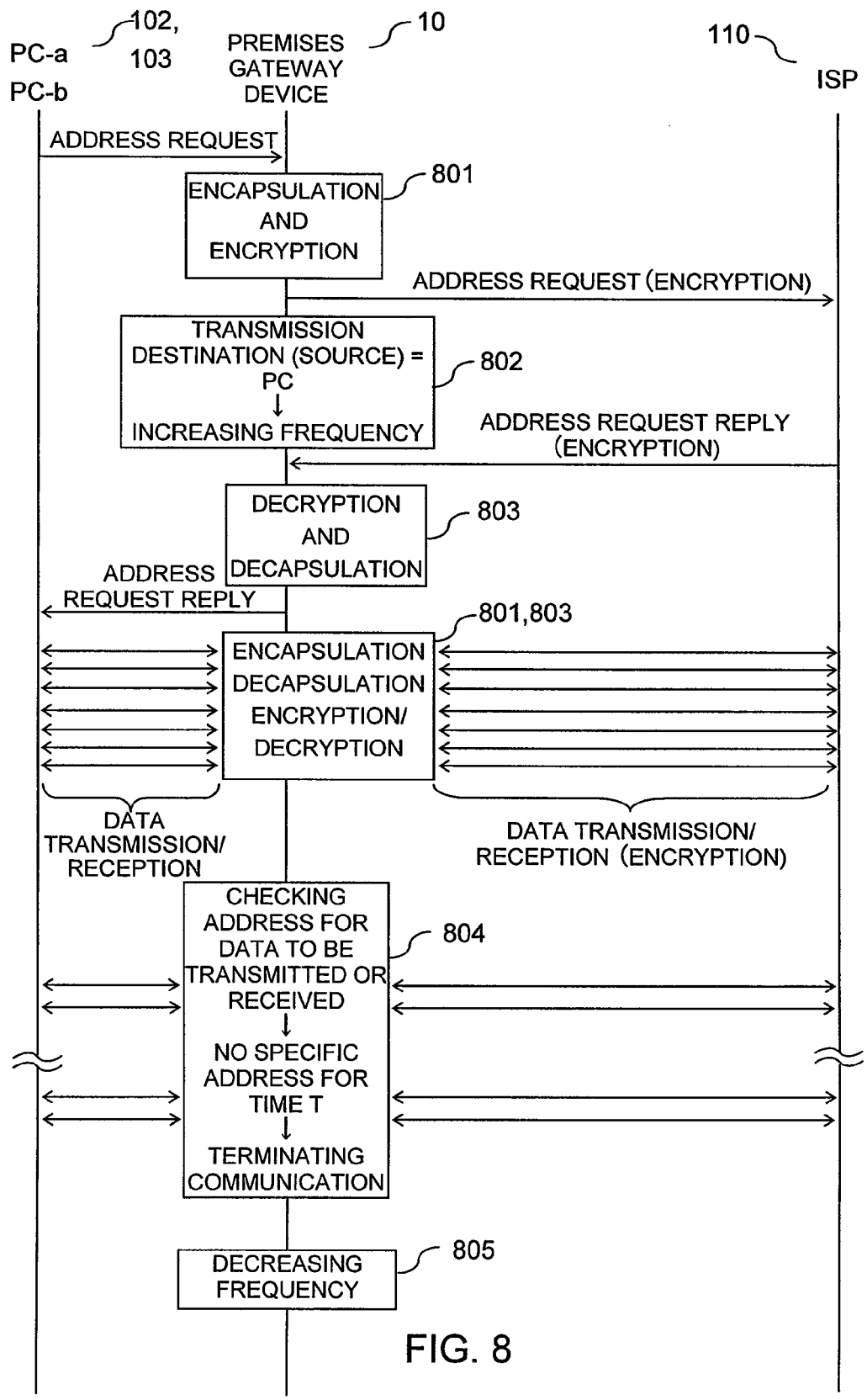
FIG. 8 is a diagram showing a sequence for PC-related data transmission/reception to be followed using the premises gateway device in accordance with the embodiment.

FIG. 8 shows a sequence for PC-related data transmission/reception.

PC-related data transmission/reception begins with access to the ISP 110 gained by the PC-a 102 or PC-b 103. First, the PC-a 102 or PC-b 103 transmits the address request signal to the premises gateway device 10 so as to obtain the address of an access destination. The premises gateway device 10 performs encapsulating and encrypting processing (801) on the received address request for the purpose of communication through the IPsec tunnel, and then transfers it to the ISP 110. At this time point, since the transmission source of data is the PC, the premises gateway device 10 decides initiation of PC-related data transmission/reception, and increases the operating frequency of the processor (802). For example, when the PC-a 102 is connected to the Ethernet interface 307 at a link rate of 100 megabits per sec, if the premises gateway device 10 receives the address request signal via the Ethernet interface 307, the clock frequency is increased by 50 MHz according to the examples shown in FIG. 7.

The premises gateway device 10 performs decryption and decapsulation on an address request reply encrypted by the ISP 110 (803), and returns the address request reply to the PC-a 102 or PC-b 103. Thereafter, data transmission/reception such as file download is carried out. Since the premises gateway device 10 has the throughput of the processor thereof improved at step 802, the premises gateway device 10 can perform encapsulating processing, decapsulating processing, and encrypting/decrypting processing (801, 803) on data to be transmitted or received without any problem. After data transmission/reception is completed, the premises gateway device 10 checks the address for the data to be transmitted or received. If the address assigned to the ISP 110, PC-a 102, or PC-b 103 is not recognized for a predetermined time T, the premises gateway device 10 decides that communication has been terminated (804). After communication is terminated, the premises gateway device 10 decreases the operating frequency of the processor by the α value (for example, 50 MHz) (805) so as to reduce the power consumption thereof.

Figure 9:
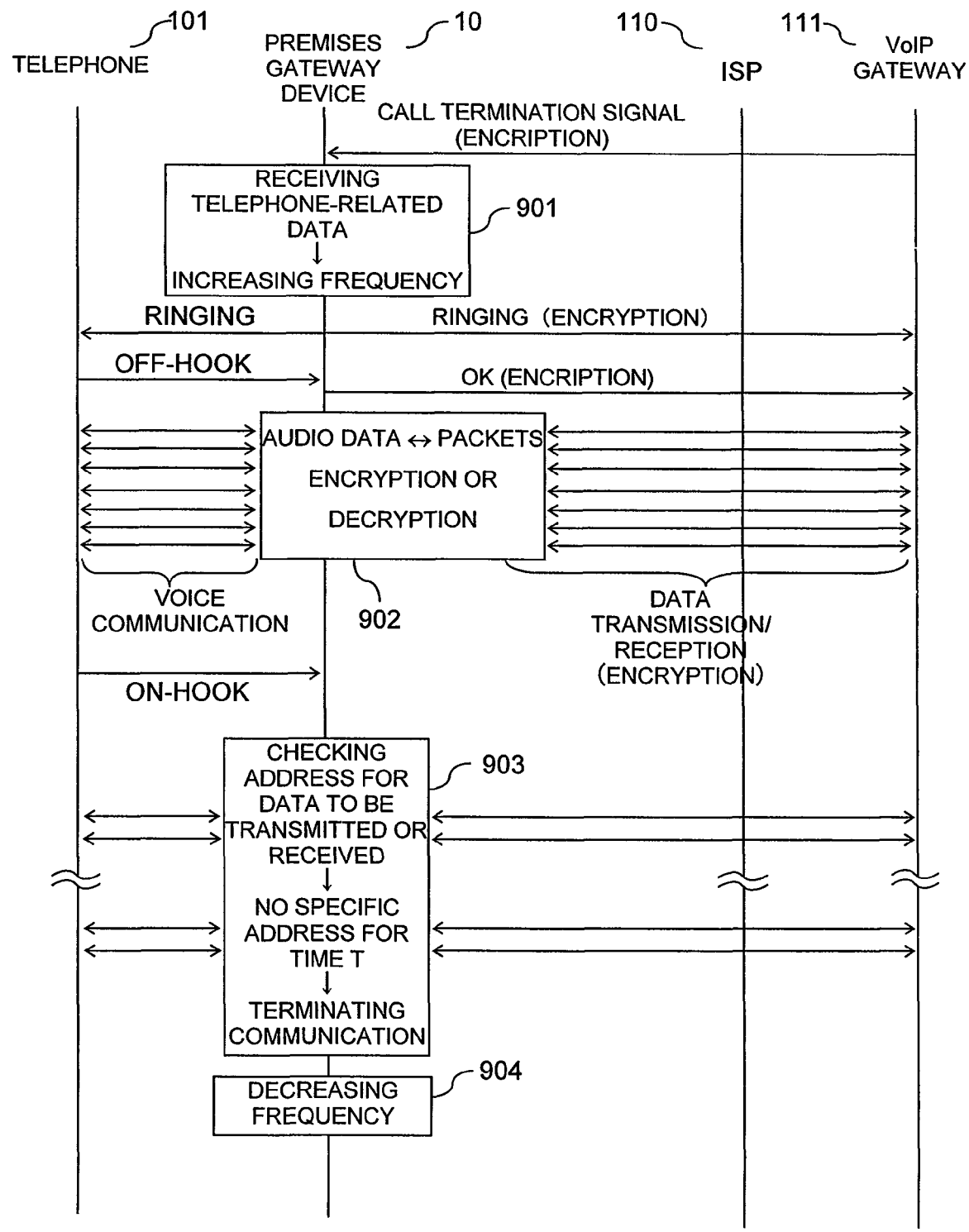
FIG. 9 is a diagram showing a sequence for telephone-related data transmission/reception to be followed at the time of call termination using the premises gateway device in accordance with the embodiment.
Figure 10:
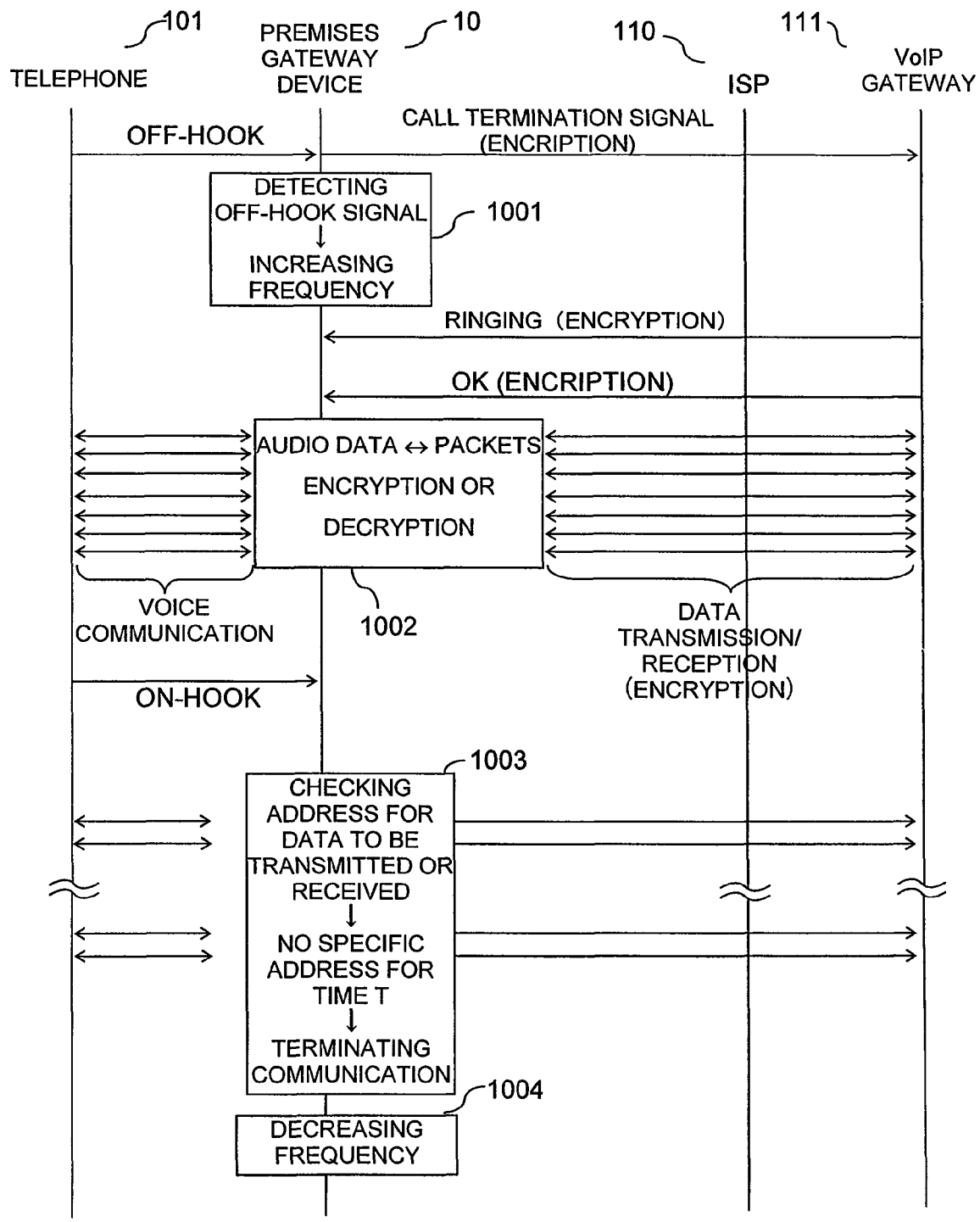
FIG. 10 is a diagram showing a sequence for telephone-related data transmission/reception to be followed at the time of call origination using the premises gateway device in accordance with the embodiment.

FIG. 9 and FIG. 10 show sequences for telephone-related data transmission/reception.

FIG. 9 is a sequence to be followed at the time of call termination. The premises gateway device 10 receives call termination signal data from the VoIP gateway 111. Since the call termination signal data is telephone-related data, the premises gateway device 10 decides initiation of telephone-related data transmission/reception, and increases the operating frequency of the processor by a frequency required for telephoning processing (901). After a session is established by ringing the called telephone and OK, voice communication is carried out. The premises gateway device 10 converts audio data into packets or vice versa, and encrypts or decrypts the data (902). Since the throughput of the processor has been improved at step 901, the pieces of processing can be performed without any problem. Since the telephone-related data is produced in the premises gateway device 10, encapsulating/decapsulating processing need not be performed on the received data and is therefore not be described. After an on-hook signal is transmitted from the telephone, the premises gateway device 10 checks the address for data to be transmitted or received. When neither call termination signal data nor an off-hook signal is not received for the time T, if the address assigned to the telephone 101 or VoIP gateway 111 is not recognized, a decision is made that communication has been terminated (903). After communication is terminated, the premises gateway device 10 decreases the operating frequency of the processor (904) so as to reduce the power consumption thereof.

FIG. 10 shows a sequence to be followed at the time of call origination.

The premises gateway device 10 detects an off-hook signal and transmits call termination signal data to the VoIP gateway 111. When detecting the off-hook signal, the premises gateway device decides initiation of telephone-related data transmission/reception and increases the operating frequency of the processor by a frequency required for telephoning processing (1001). After a session is established by ringing a called telephone and OK, voice communication is carried out. The premises gateway device 10 converts audio data to packets or vice versa, and encrypts the data (1002). Since the throughput of the processor has been improved at step 1001, the pieces of processing can be achieved without any problem. After an on-hook signal is transmitted from the telephone, the premises gateway device 10 checks the address for data to be transmitted or received. When neither call termination signal data nor the off-hook signal has been received for the time T, if the address assigned to the telephone 101 or VoIP gateway 111 is not recognized, a decision is made that communication has been terminated (1003). After communication is terminated, the premises gateway device 10 decreases the operating frequency of the processor (1004) so as to reduce the power consumption thereof.

Figure 11:
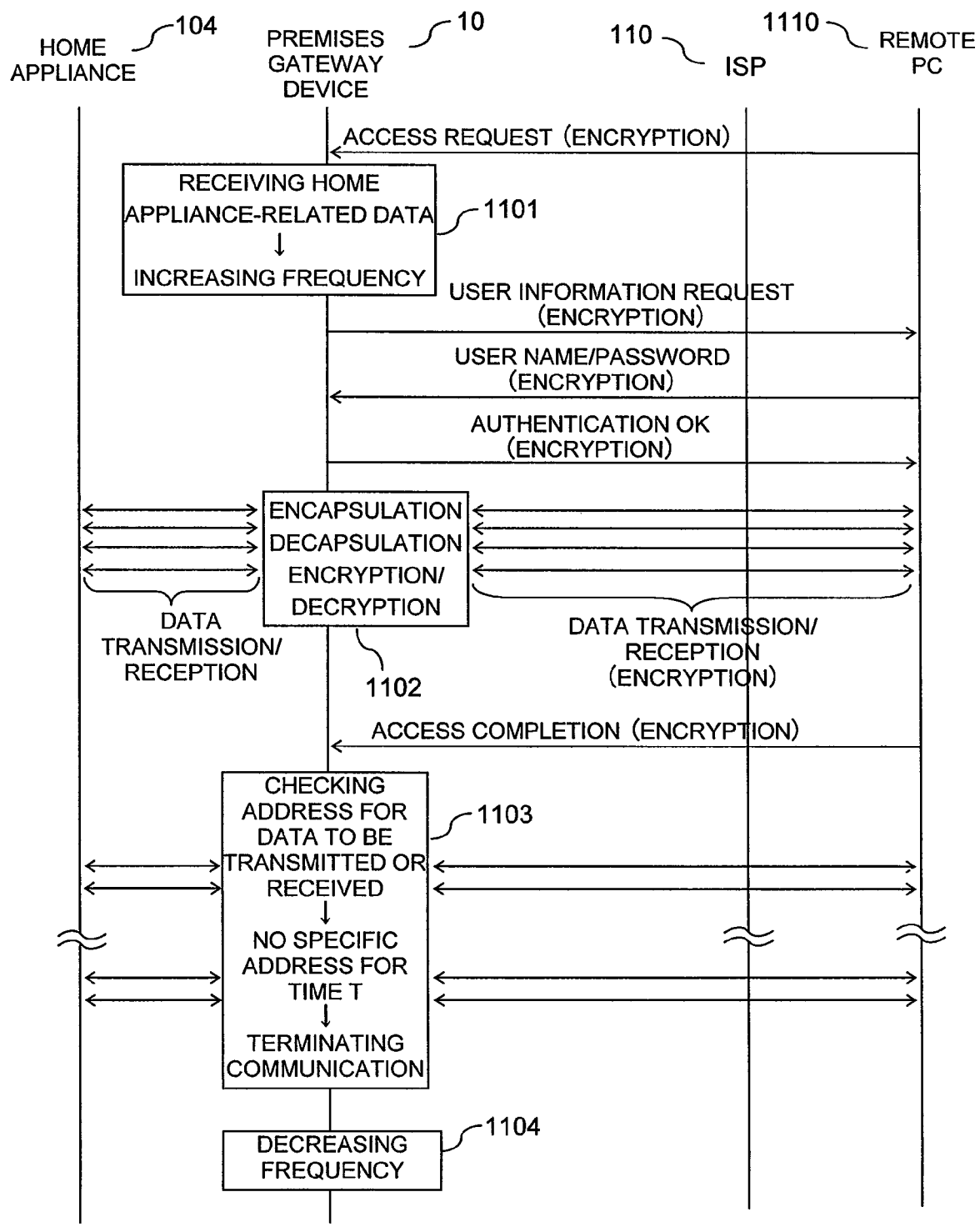
FIG. 11 is a diagram showing a sequence for remote access to a home appliance to be followed using the premises gateway device in accordance with the embodiment.

FIG. 11 shows a sequence for remote access to the home appliance 104.

The remote PC or the like 1110 connected on the Internet transmits access request data to the premises gateway device 10 so as to access the home electric equipment 104. By receiving the data, a decision is made that the data is home appliance-related data. The premises gateway device 10 therefore increases the operating frequency of the processor thereof by a frequency required for treating the home appliance-related data (1101). When authentication based on a user name and a password is completed, data is transmitted or received between the remote PC or the like 1110 and the home appliance 104. Since the premises gateway device 10 has the throughput of the processor thereof improved at step 1101, the premises gateway device 10 can perform encapsulating processing, decapsulating processing, and encrypting/decrypting processing on the data to be transmitted or received without any problem (1102). After an access completion signal is transmitted from the remote PC 1110, the premises gateway device 10 checks the address for data to be transmitted or received. If an address assigned to the remote PC 1110 or home appliance 104 is not recognized for the time T, the premises gateway device 10 decides that communication has been terminated (1103). After communication is terminated, the premises gateway device 10 decreases the operating frequency of the processor (1104) so as to reduce the power consumption thereof.

In relation to the present embodiment, a description has been made of a telephony service, access to the Internet by a PC, and remote access to a digital home appliance. The same idea can be applied to other services.

The ONU 21 and premises gateway device 10 shown in FIG. 1 may be integrated into one body. In this case, the foregoing pieces of means are applied to the processor included in the ONU, and the same reduction in power consumption dependent on a baud rate for the PON interval can be accomplished. Further, a frequency band employed between the OLT 22 and ONU 21 is controlled by a feature called dynamic bandwidth allocation (DBA), and the information is used as frequency control information concerning the processor. Thus, reduction in power consumption can be effectively realized.

The present invention can be adapted to, for example, a premises gateway device. For example, in the premises gateway device to which the present invention is adapted, even when a service for which the power supply of a telephone or the like cannot be turned off is supported, reduction in power consumption can be achieved.

What is claimed is:

1. A premises gateway device that is connected to plural pieces of premises network equipment and transmits or receives data between the premises network equipment and a network of outdoor, comprising:

a processing unit that encrypts data received from the premises network equipment and transfers the data to the network, decrypts encrypted data received from the network and transfers the data to the premises network equipment consistent with destination and, operates according to an input clock;

a frequency determination table in which predetermined control quantities for a clock frequency are stored for the plural pieces of premises network equipment;

a clock frequency control unit that references the frequency determination table to obtain a clock frequency; and a clock production unit that produces a clock having the clock frequency obtained by the clock frequency control unit, and outputs the clock to the processing unit, wherein:
when the clock frequency control unit detects a signal that signifies initiation of communication and is sent from the premises network equipment, or a signal that signifies initiation of communication and is sent to the premises network equipment, the clock frequency control unit references the frequency determination table to acquire a control quantity for the clock frequency associated with the premises network equipment and, increases the clock frequency by the control quantity for the clock frequency which is acquired; and
when the clock frequency control unit detects termination of communication with the premises network equipment, the clock frequency control unit decreases the clock frequency by the control quantity for the clock frequency.

2. The premises gateway device according to claim 1, wherein
at least one of the plural pieces of premises network equipment is a telephone, and
the signal that signifies initiation of communication is an on-hook signal or an off-hook signal sent from the telephone.

3. The premises gateway device according to claim 1, wherein
at least one of the plural pieces of premises network equipment is a telephone, and
the signal that signifies initiation of communication is a call termination signal sent to the telephone.

4. The premises gateway device according to claim 1, wherein
at least one of the plural pieces of premises network equipment is a personal computer or data communication equipment, and
the signal that signifies initiation of communication is an address request signal sent from the personal computer or data communication equipment.

5. The premises gateway device according to claim 1, wherein
at least one of the plural pieces of premises network equipment is a home appliance, and
the signal that signifies initiation of communication is an access request signal sent from remote equipment on the network to the home appliance.

6. The premises gateway device according to claim 1, wherein
when the time during which data sent from the premises network equipment or data sent to the premises network equipment has not been received exceeds a predetermined time, the clock frequency control unit detects the termination of communication with the premises network equipment.

7. The premises gateway device according to claim 1, further comprising
plural interfaces to which the pieces of premises network equipment to be connected are determined in advance, wherein:
the clock frequency control unit identifies the interface via which a signal is received to identify the premises network equipment and, references the frequency determination table to acquire the control quantity for the clock frequency associated with identified premises network equipment.

8. The premises gateway device according to claim 1, wherein
the processing unit and clock frequency control unit are realized with one processor.

* * * * *